United States Patent [19]

Scott et al.

[11] 4,265,340
[45] May 5, 1981

[54] DISK BRAKE MOUNTING

[75] Inventors: Orland B. Scott, Maidstone, Canada; Garrett S. Van Camp, Southfield, Mich.

[73] Assignee: Ford Motor Company, Dearborn, Mich.

[21] Appl. No.: 920,565

[22] Filed: Jun. 29, 1978

[51] Int. Cl.³ ............................................. F16D 65/02
[52] U.S. Cl. .................................. 188/73.3; 188/73.5
[58] Field of Search ................... 188/71.1, 72.1, 72.4, 188/73.3, 73.5

[56] References Cited

U.S. PATENT DOCUMENTS

| | | | |
|---|---|---|---|
| 3,616,876 | 11/1971 | Brooks | 188/73.3 |
| 3,805,925 | 4/1974 | Schoenberg | 188/73.3 |
| 4,027,750 | 6/1977 | Kawamoto et al. | 188/73.3 |
| 4,082,167 | 4/1978 | Einchcombe et al. | 188/73.3 |

Primary Examiner—Duane A. Reger
Attorney, Agent, or Firm—Peter Abolins; Clifford L. Sadler

[57] ABSTRACT

This specification discloses a caliper disk brake which is mounted with respect to a support structure so as to improve sliding movement between the caliper housing of the disk brake and the support structure and thus reduce drag, piston shake backs, piston knock-back, and free brake pedal travel. The coupling between the support structure and the disk brake housing also permits some relative twisting movement so that the friction element of the disk brake can align against a rotatable disk or rotor which has also twisted. The coupling includes a mounted resilient bushing having an axial cavity wherein is received a sleeve having a low coefficient of friction. A supporting locating pin is slidably received within the sleeve thus permitting relative movement between the housing and the support structure in a direction transverse to the plane of the rotor. Additionally, the resilient bushing permits some rotational or twisting movement between the disk brake housing and the support structure.

8 Claims, 5 Drawing Figures

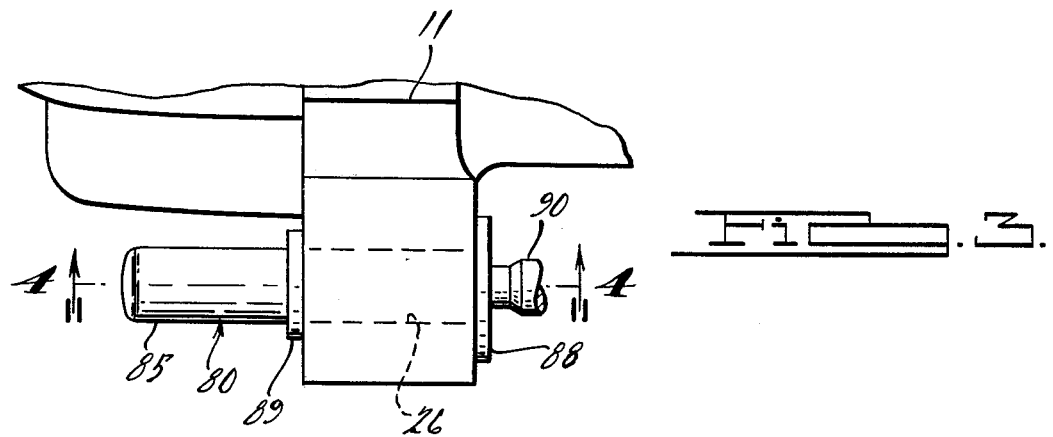
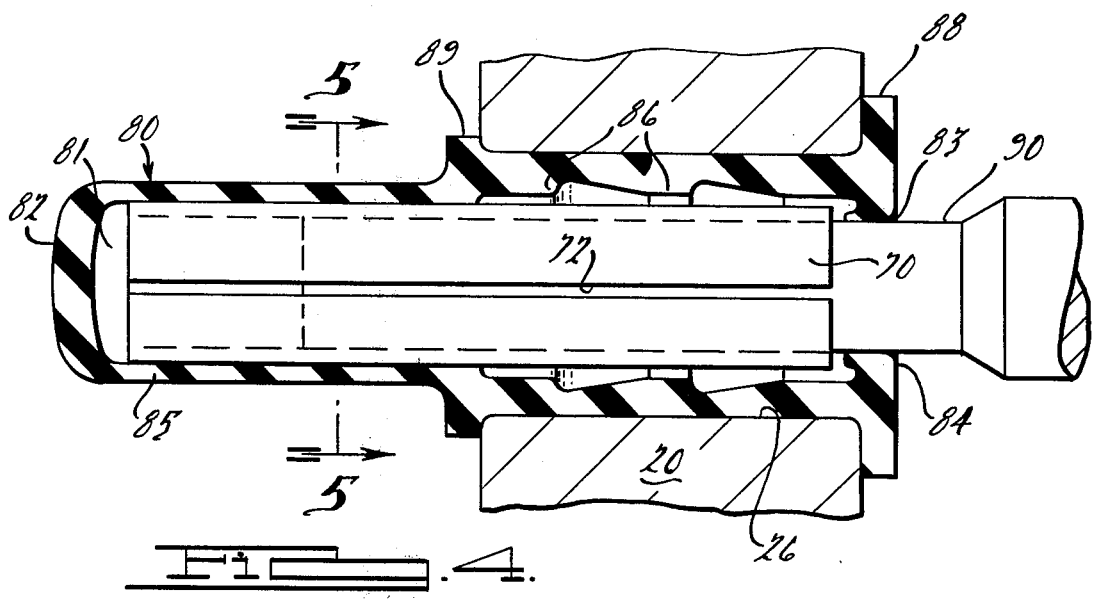
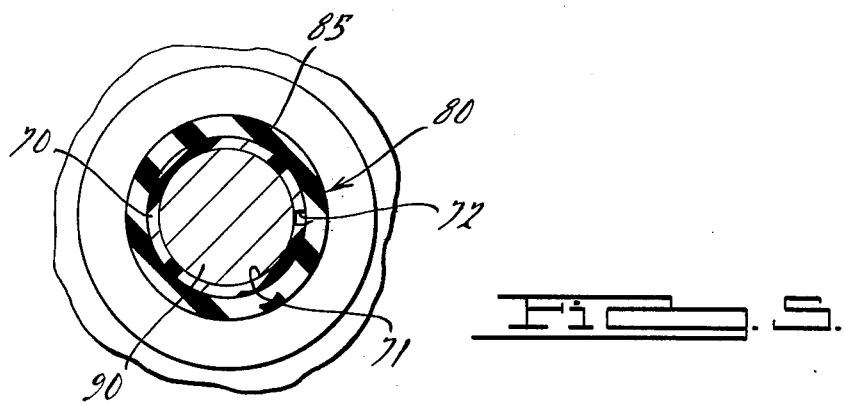

DISK BRAKE MOUNTING

BACKGROUND OF THE INVENTION (1) Field of the Invention

This invention relates generally to braking devices and, more particularly to a disk brake mounting apparatus and method.

(2) Prior Art

The prior art teaches a "floating head" disk brake wherein there is a single piston supporting one friction element, a housing supporting the other friction element and the housing is mounted for sliding action on a fixed support member transversely to a rotor disk for braking engagement therewith. There are various known means for achieving the slidable movement between the disk brake housing and the support structure. For example, yieldable means in the form of flexible straps can couple the support structure with the slidable housing so that the slidable housing is supported on the support structure for slidable movement relative thereto by the flexible straps. In order to actuate the brakes and bring each of the brake shoes into engagement with opposite sides of the rotor, the flexible straps must flex in a direction generally perpendicular to the plane of rotation of the rotor to be braked. In these prior art devices, there is resistance to the movement of the housing due to the physical characteristic of the flexible straps due to the necessity for bending the straps with a certain amount of force. Also, due to the characteristics of the flexible straps there is a certain amount of hysterisis involved so that the housing may not return to its original position when a braking system is relaxed.

Attempts have been made to improve the performance of these flexible straps by having loops positioned therein which permit the ends of the springs, which support the housing on the support structure, to move relative to each other by a rolling movement of the loop formed in the spring. This rolling action reduces the resistance to movement and hysterisis effect. Nevertheless, any such improvement is achieved with additional complexity and cost, and does not provide a desirable solution to the problem.

Another prior art disk brake design includes a sliding action wherein pins are rigidly mounted to a floating brake shoe housing and semicircular receiving grooves, for the pins, are located in the stationary support member with sufficient tolerances between the pin and the grooves to allow reasonably free sliding action therebetween. This type of design has been known to produce excessive brake rattle during normal driving. To solve the rattle problem, members have been added to exert forces against the pin elements to pre-clude rattle between the pin elements and the slots located in the arms or support members. Although this technique reduces the rattle problem, the force against the pin elements by the pressure members introduces an undesirable resistance to lateral sliding of the pin elements, and thus, also, of the caliper housing.

This resistance to lateral sliding cause a condition frequently referred to in the disk brake industry as "drag", "knock-back" or "shake-back". Drag results from the brake lining being held against the disk due to the resistance to lateral sliding. Drag is objectionable because it increases wear and fuel consumption. Knockback results from a deflection or wandering of the brake disk or rotor which engages a brake lining and friction member and thus the piston, forcing the piston back into its associated cylinder. Knockback is objectionable and requires upon the next brake application, that the brake pedal travel an unnecessary distance for the brake piston friction member to again grip the rotating disk.

The prior art also teaches a coupling between the disk brake housing and the support structure wherein the housing has rigidly secured thereto a pin element which is slidingly retained by a sleeve element. The pin element and sleeve element in combination provide a bearing member for the support structure which floatingly and slidingly carries the housing for movement in a direction transverse to the plane of the rotor. Springs secure the sleeve to the support structure. When the sleeve and spring combination is used, the sleeve must be sufficiently strong to support the pin and the springs must be sufficiently strong to retain the sleeve so that the sleeve does not come free of the support structure thereby reducing braking effectiveness. Typically, the assembly of the springs to the support structure requires a secure fastening which may require a difficult manufacturing step such as threading a spring through an opening. Further, when the sleeve must perform the two functions of providing a sliding surface and providing support, it can be optimized for neither function. These are some of the objections this new invention overcomes.

SUMMARY OF THE INVENTION

This invention improves shake-back or knock-back characteristics and reduces free brake pedal travel by recognizing that dividing the function of providing a low friction sliding surface and a support surface for retaining a sliding pin can be separated. More particularly, the coupling between a support member and a brake housing includes a low friction sleeve material surrounding a laterally moving pin and mounted within the axial cavity of a resilient bushing.

A disk brake includes a rotor means and a floating head caliper having a housing within which a hydraulic piston means is operative for generating an actuating force so that the housing and the hydraulic piston means are urged in opposing directions. The disk brake also includes an outer friction element mounted on the housing and an inner friction element mounted on the piston means, the outer and inner friction elements acting in cooperation with the rotor means and generating a braking force to reduce rotation of the rotor means. A support means for the caliper positions the inner and outer friction elements on opposite sides of the rotor means and transmits a reactive torque so that the braking force can be applied to the rotor means. The coupling between the housing and the support means includes a pin means with a longitudinal axis generally transverse to the plane of rotation of the rotor means. The pin means is slidably supported by a mounting means.

The mounting means includes a relatively low friction sleeve means surrounding the pin means and a resilient means covering the outer surface of the sleeve means. In one parti-cular embodiment, the housing has an opening for receiving the resilient means and the pin means is attached to the support means. There is sliding movement between the pin means and the sleeve means and limited angular movement between the pin means and the housing thereby helping to maintain the inner and outer friction elements in a normal rest position adjacent the rotor means even after the rotor means has deflected and caused relative motion between the housing and the support means. That is, the mounting means minimizes relative movement between the housing and the piston means so that the friction elements can retain their normal position with respect to the rotor means.

It can readily be appreciated that the improvement in reducing brake drag and pedal travel after a "shakeback" or "knock-back" condition has occured increases consumer satisfaction and, generally, brake performance. Further, it is particularly advantageous that such an improvement can be achieved using relatively simple components to manufacture and to assemble.

BRIEF DESCRIPTION OF THE DRAWINGS

FIG. 3 is a top plan view of a portion of the assembled elements of FIG. 2;

FIG. 4 is a longitudinal partial sectional view generally along section line 44 of FIG. 3;

FIG. 5 is a transverse partial sectional view generally along section line 5—5 of FIG. 4.

DETAILED DESCRIPTION OF THE PREFERRED EMBODIMENT

Figure 1:
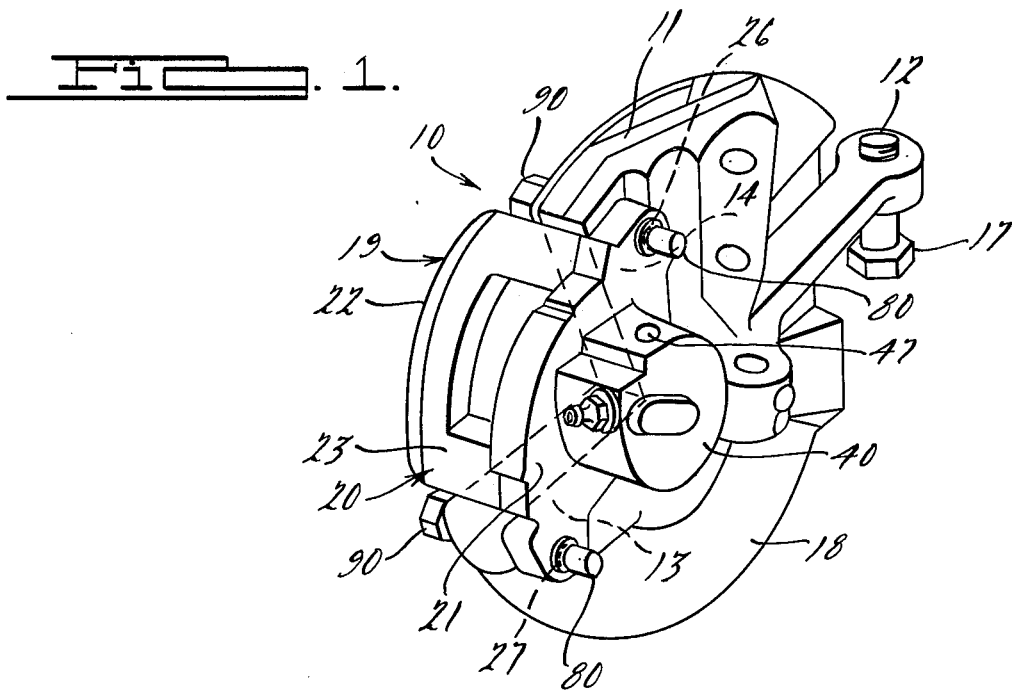
FIG. 1 is a perspective view of a disk brake with two circumferentially spaced support means in accordance with the embodiment of this invention.

Referring now to FIG. 1, a spindle 11 is a part of a disk brake assembly 10 and is connected to a non-rotating member such as the suspension system of an automobile. Disk brake assembly 10 includes a caliper assembly 19 having a housing 20 which extends on each side of a rotor 18 and supports friction elements 50 and 60 (FIG. 2) so they can be applied against rotor 18 preventing rotation. The connection between housing 20 and spindle 11 includes a low friction sleeve 70 (FIG. 2) mounted in a resilient support bushing 80 coupled to housing 20 so that a pin 90 coupled to spindle 11 can slide longitudinally within sleeve 70. Thus, sleeve 70 provides low friction movement between housing 20 and spindle 11 in a generally transverse direction to the plane of the rotor 18. Further, bushing 80 is sufficiently resilient so that some twisting between housing 20 and spindle 11 can occur and still keep friction elements 50 and 60 generally parallel for engagement with rotor 18.

Rotor 18 is securely fastened to a wheel and a hub by bolts (not shown). Spindle 11 has mounting bosses 12 having extending therethrough a bolt 17 for mounting spindle 11. Spindle 11 is equipped with a pair of circumferentially spaced integral arms 13 and 14, as shown in dotted outline in FIG. 1. A pin 90 can be attached to arm 14 by a threaded screw coupling wherein an internally threaded opening in an arm 14 mates with an externally threaded portion of pin 90. Arm 13 can have a similar coupling to another pin.

Figure 2:
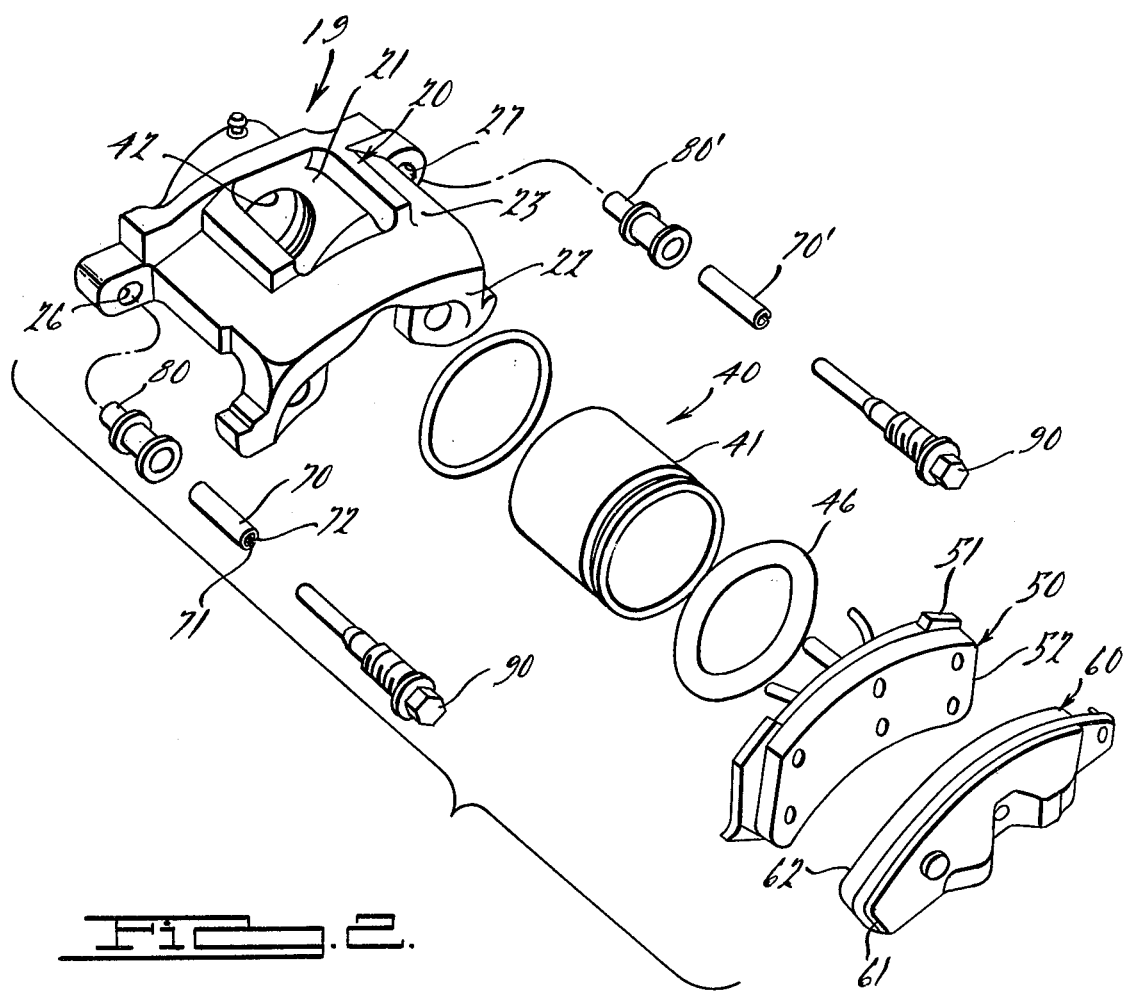
FIG. 2 is a perspective, exploded view of a portion of FIG. 1 as viewed from the rear of FIG. 1.

Referring to FIG. 2, housing 20 straddles rotor 18 and is slidably mounted on spindle 11 for movement in a direction transverse to the rotor faces. That is, movement is in a direction along the axis of rotor 18 both toward and away from the rotor faces. Housing 20 includes an inwardly radially extending portion 21 overlying a portion of one of the rotor faces and another portion 22 extending radially inwardly on the other side of the rotor face and overlying a portion of the rotor face. The radial portions 21 and 22 are joined together by a bridge member 23 to thereby provide a housing made of a single casting. In order to impart transverse braking movement to housing 20, an actuator 40 is located in the radially inwardly extending portion 21, comprising a piston 41 slidably received within a bore 42.

Still referring to FIG. 2, the open end of bore 42 is sealed against admission of foreign matter by a rubber boot 46 which has one end connected to the housing 20 and the other end connected to piston 41. Boot 46 also prevents escape of fluid through the opening of the bore. Further, boot 46 can be used to bias piston 41 with respect to bore 42 so that friction elements 50 and 60 are clear of rotor 18 in the absence of an applied braking force. Hydraulic pressure from a master cylinder is communicated to a chamber adjacent piston 41, through an inlet port 47 (FIG. 1). Friction element 60 is carried by the radial portion 22 of housing 20, lies adjacent one face of rotor 18 in proximate relationship thereto and includes a backing plate 61 and a friction lining 62. Piston 41 supports friction element 50 for frictional engagement with the side of the rotor face opposite to the side engaged by the first friction element 60. Analogously, friction element 50 includes a backing plate 51 and a friction lining 52.

Housing 20 includes a pair of circumferentially spaced openings 26 and 27 each of which includes a low friction sleeve and a resilient support bushing combination to couple housing 20 to spindle 11. Accordingly, opening 27 receives a resilient bushing 80' which in turn receives a low friction sleeve 70' and a pin 90'. These are similar in all respects to the sleeve 70, bushing 80 and pin 90 received by opening 26 and have the characteristics of sleeve 70, bushing 80 and pin 90 herein described (see FIG. 2).

Low friction sleeve 70 is a cylindrical member having a longitudinal axial cavity 71 and a longitudinal slit 72 the full length of sleeve 70 (FIGS. 2, 4 and 5). Longitudinal slit 72 permits coiling of sleeve 70 about its own axis so that its outer diameter can be temporarily reduced for easy insertion into bushing 80. A typical material for sleeve 70 is teflon.

Referring to FIG. 4, resilient support bushing 80 has a generally cylindrical wall 85 with an axial cavity 81 having a closed end 82 and an opposing open end 83 which has a flange 84 extending inwardly from cylindrical wall 85. When a coiled sleeve 70 is inserted into axial cavity 81 and uncoils, inwardly extending flange 84 prevents sleeve 70 from slipping out of bushing 80. Additionally, inwardly extending flange 84 abuts pin 90 which extends into cavity 71 of sleeve 70 when mounted in bushing 80 and prevents impurities from entering cavity 71. If needed, flange 84 can be bifurcated into a stop protrusion for retaining sleeve 70 and a sealing protrusion for closing off one end of axial cavity 81.

The outer surface of cylindrical wall 85 includes a pair of spaced outwardly extending flanges 88 and 89. Outwardly extending flange 88 opposes inwardly extending flange 84 and outwardly extending flange 89 is spaced along cylindrical wall 85 toward closed end 82 sufficiently so that housing 20 can be positioned between flanges 88 and 89. That is, the length of opening 26 is approximately equal to the distance separating flanges 88 and 89. Flanges 88 and 89 are sufficiently resilient so that deflecting flanges 88 and 89 and cylindrical wall 85 permits bushing 80 to be inserted into opening 26. Bushing 80 is a voided bushing in that the interior of cylindrical wall 85 contains ridges 86 which have intervening valleys or voids for providing a spring member in bushing 80. Such a spring member facilitates a snug fit between the outer diameter of bushing 80 and opening 26 in housing 20. Further, the spring member facilitates a snug fit between sleeve 70 and the interior of cylindrical wall 85. Also, the presence of a compressible spring member within bushing 80, such as is provided by ridges 86 and valleys 87, permits friction elements 50 and 60 to follow twisting of rotor 18. A typical material for bushing 80 is rubber.

OPERATION

The mounting of housing 20 to spindle 11, including sleeves 70 and 70', bushings 80 and 80' and pins 90 and 90', provides for a combination of twisting and sliding movement between housing 20 and spindle 11. Thus, pressing a brake pedal forces piston 41 and associated friction element 50 toward rotor 18 and produces a corresponding force in the opposite direction which presses opposing friction element 60 against rotor 18 from the other side. Thus, housing 20 can align to rotor 18 by sliding and twisting movement with respect to spindle 11. Such movement is facilitated by the low friction material of sleeves 70 and 70' and the resilient flexibility of bushings 80 and 80'.

A disk brake mounting in accordance with an embodiment of this invention permits sufficient adjustment in a lateral position of housing 20 with respect to spindle 11 so that housing 20 can be centered about rotor 18 even if rotor 18 deflects. This is further desirable to compensate for manufacturing tolerances and for wear of frictional elements 50 and 60.

Accordingly, the mounting in accordance with an embodiment of this invention provides a low friction attachment in contrast to a high friction housing or caliper attachment. More specifically, with a high friction caliper attachment, when the rotor flexes relative to the spindle and pushes on the hydraulic piston, the hydraulic piston moves relative to the caliper housing because the caliper housing is held tightly with respect to the spindle. Such movement of the piston causes movement of brake fluid back into the master brake cylinder causing increased brake pedal travel with the next brake application. In contrast, with a low friction housing or caliper attachment the above sequence is altered. Although flexing of the rotor relative to the spindle still exerts a push on the hydraulic piston, the hydraulic piston does not move relative to the caliper housing. Instead, the hydraulic piston and caliper housing move together because of the low friction between the caliper and the spindle attachment. As a result of such joint movement, there is no movement of brake fluid back into the master brake cylinder and there is less free brake pedal travel with the next brake application. Reduced brake drag also improves fuel economy.

Various modifications and variations will no doubt occur to those skilled in the various art to which this invention pertains. For example, the particular shape of the exterior flanges on the outside of the rubber bushing for stabilizing longitudinal movement of the bushing with respect to the housing may be varied from that disclosed herein. Similarly, the particular size and shape of the ridges and valleys providing spring means within the bushing may be varied from that disclosed. These and all other variations which basically rely on the teachings through which this disclosure has advanced are properly considered within the scope of this invention.

We claim:

1. A disk brake assembly comprising:
    a rotor means for receiving a braking force for reducing rotation of said rotor means;
    a caliper having a housing within which a hydraulic piston means is operative for generating an actuating force so that said housing and said hydraulic piston means are urged in opposing directions;
    an outer friction element mounted on said housing and an inner friction element mounted on said piston means, said outer and inner friction elements acting in cooperation with said rotor means in generating a braking force;
    a support means for said caliper so that said inner and outer friction elements can be positioned on opposite sides of said rotor for transmitting a reactive torque so a braking force can be applied to said rotor means; and
    a mounting means for coupling said caliper to said support means, said mounting means including a pin means having an axis generally transverse to the plane of rotation of said rotor means, a relatively low friction sleeve means adjacent said pin means, and a resilient means covering the outer surface of said sleeve means so as to permit sliding movement between said pin means and said sleeve means and limited angular twisting movement between said caliper and said support means thereby helping to maintain said inner and outer friction elements in a normal rest position adjacent said rotor means even after said rotor means has deflected from a normal position.

2. A disk brake assembly as recited in claim 1 wherein said support means includes a spindle means for supplying a stationary reactive force to said caliper, said sleeve means is a hollow cylindrical member made of a plastic material and said resilient means includes generally hollow cylindrical portion sized to fit around said sleeve means.

3. A disk brake assembly as recited in claim 2 wherein said housing includes an opening for receiving said resilient means and said spindle means is attached to said pin means thus slidably coupling said housing to said spindle.

4. A disk brake assembly as recited in claim 1 wherein said sleeve means includes:
    a hollow cylindrical member having a relatively low coefficient of friction and a longitudinal slit along the entire length of said sleeve so that said sleeve can be coiled to a reduced diameter for easy insertion into said resilient means, said sleeve means having a length shorter than said resilient means and said sleeve having an inner diameter in an uncoiled state sufficiently large to be mounted on the outer surface of said pin means.

5. A disk brake assembly as recited in claim 1 wherein said resilient means includes:
    a generally hollow cylindrical portion having an axial cavity with one closed end and one open end for receiving said sleeve means and said pin means, a first and a second stop means spaced from one another along the longitudinal axis of said cylindrical portion, said first and second stop means extending outwardly from said cylindrical portion so as to provide a point of resistance for interferring with relative movement between said resilient means and an adjacent supporting portion of said disk brake assembly, said first and second stop means being spaced sufficiently far apart so as to receive therebetween said supporting portion of said disk brake assembly, a third stop means extending into said axial cavity for interferring with movement of said sleeve means, said third stop means being sufficiently spaced from said closed end so as to receive said sleeve means between said third stop means and said closed end, a flange means extending radially inward into said axial cavity sufficiently so that when said pin means is inserted into said axial cavity said flange means forms a seal around said pin means thus sealing the interior of said axial cavity between said flange means and said closed end from impurities, a spring means adjacent said axial cavity for compensating for manufacturing tolerances in the fit between said sleeve means, said resilient means, said support portion of said disk brake assembly and said caliper, and so that caliper can follow twisting movement of said rotor means and return to a substantially normal at rest position when said rotor means returns to a normal at rest position.

6. A disk brake assembly comprising:

a rotor for receiving a braking force for resisting rotation of said rotor;

a spindle nonrotationally mounted with respect to said rotor for providing a reactive torque when said braking force is applied;

a caliper having a housing within which a hydraulic piston is operative for generating an actuating force so that said housing and said hydraulic piston are urged in opposing directions, said housing having a mounting opening therein;

an outer friction element mounted on said housing and an inner friction element mounted on said piston, said outer and inner friction elements acting in cooperation with said rotor in generating said braking force;

a resilient mounting having an axial cavity closed at one end and open at the other end, said resilient mounting being received within said housing mounting opening;

a friction reducing, hollow, cylindrical sleeve received within said axial cavity;

a pin extending from said spindle and received within said sleeve thereby slidably supporting said caliper with respect to said spindle;

said sleeve having a longitudinal slit so that the outer diameter of said sleeve can be reduced to facilitate insertion into said axial cavity of said resilient mounting; and said resilient mounting having longitudinally spaced, outwardly extending flanges for receiving therebetween the walls of said housing mounting opening and preventing said resilient mounting from sliding out of said housing mounting opening, said outwardly extending flanges being sufficiently pliable and said resilient mounting being sufficiently pliable for insertion into said housing mounting opening, said resilient mounting further including an inwardly extending flange extending into said axial cavity so that said sleeve can be prevented from sliding along the wall of said axial cavity and so that said axial cavity can be sealed at the open end by abutment of said pin against said inwardly extending flange means, and annular ridges in the wall of said cavity between said open and closed ends for providing a spring action to permit some relative twisting between said caliper and said spindle and for providing a biasing force stabilizing the mounting between said pin and said spindle.

7. A disk brake assembly as recited in claim 6 wherein said spindle and said caliper have a pair of opposing locations for coupling one to the other, said pair of opposing locations being displaced from one another, and each location of said pair of locations having associated therewith one of said housing mounting openings, said resilient mounting, said sleeve and said pin.

8. A disk brake assembly comprising:

a rotor means for receiving a braking force for reducing rotation of said rotor means;

a caliper having a housing within which a hydraulic piston means is operative for generating an actuating force so that said housing and said hydraulic piston means are urged in opposing directions;

an outer friction element mounted on said housing and an inner friction element mounted on said piston means, said outer and inner friction elements acting in cooperation with said rotor means in generating a braking force;

a support means for said caliper so that said inner and outer friction elements can be positioned on opposite sides of said rotor for transmitting a reactive torque so a braking force can be applied to said rotor means; and a mounting means for coupling said caliper to said support means, said mounting means including a pin means having an axis generally transverse to the plane of rotation of said rotor means, a relatively low friction sleeve means adjacent said pin means, and a resilient means covering the outer surface of said sleeve means so as to permit sliding movement between said pin means and said sleeve means.

* * * * *